United States Patent
Yaw et al.

(10) Patent No.: US 10,442,137 B2
(45) Date of Patent: Oct. 15, 2019

(54) SYSTEMS AND METHODS FOR PLANNING PRINTING OF THREE-DIMENSIONAL OBJECTS

(71) Applicant: Shapeways, Inc., New York, NY (US)

(72) Inventors: Hunter Yaw, Brooklyn, NY (US); Stefan Rink, Sterksel (NL); Robert Capo, Jersey City, NJ (US); Jacob Sonk, Brooklyn, NY (US); Paul Hortiatis, New York, NY (US); Martin Delgado-Gambini, Yonkers, NY (US); Barry Schepers, Eindhoven (NL); Tiago André Costa São José, Eindhoven (NL); Zachary Hansen, Dillon, NY (US); Maarten van Dijk, Eindhoven (NL)

(73) Assignee: Shapeways, Inc., New York, NY (US)

( * ) Notice: Subject to any disclaimer, the term of this patent is extended or adjusted under 35 U.S.C. 154(b) by 0 days.

(21) Appl. No.: 15/718,123

(22) Filed: Sep. 28, 2017

(65) Prior Publication Data
US 2018/0093417 A1    Apr. 5, 2018

Related U.S. Application Data

(60) Provisional application No. 62/402,788, filed on Sep. 30, 2016.

(51) Int. Cl.
*B29C 64/393*   (2017.01)
*B33Y 50/02*    (2015.01)
*G05B 19/4099*  (2006.01)

(52) U.S. Cl.
CPC ............ *B29C 64/393* (2017.08); *B33Y 50/02* (2014.12); *G05B 19/4099* (2013.01); *G05B 2219/35134* (2013.01); *G05B 2219/49007* (2013.01)

(58) Field of Classification Search
CPC . G05B 13/04; G05B 19/4069; G05B 19/4187
See application file for complete search history.

(56) References Cited

U.S. PATENT DOCUMENTS

| 5,352,405 A | 10/1994 | Beaman et al. |
| 2004/0178531 A1 | 9/2004 | Nielsen et al. |

(Continued)

OTHER PUBLICATIONS

International Search Report and Written Opinion for International Application No. PCT/US2017/53879 dated Dec. 26, 2017.

*Primary Examiner* — Vincent H Tran
(74) *Attorney, Agent, or Firm* — Wolf, Greenfield & Sacks, P.C.

(57) ABSTRACT

A system for planning printing of three-dimensional (3D) objects. The system comprises at least one computer hardware processor, and at least one non-transitory computer-readable storage medium storing processor-executable instructions that, when executed by the at least one computer hardware processor, cause the at least one computer hardware processor to perform acts of: accessing information specifying a plurality of 3D objects to be printed using at least one 3D printer, the at least one 3D printer including a first 3D printer; determining a priority for each of at least some of the plurality 3D objects to obtain determined 3D object priorities; assigning, based on the determined 3D object priorities, a subset of the plurality of 3D objects to a first printer tray adapted for use with the first 3D printer; and obtaining a packing plan indicating an arrangement of the subset of the 3D objects within the first printer tray.

26 Claims, 7 Drawing Sheets

(56) References Cited

U.S. PATENT DOCUMENTS

| | | | |
|---|---|---|---|
| 2012/0033253 A1* | 2/2012 | Mori | G06F 3/1263 358/1.15 |
| 2013/0329243 A1* | 12/2013 | Pettis | F16M 11/12 358/1.13 |
| 2014/0244017 A1 | 8/2014 | Freiwirth et al. | |
| 2015/0057784 A1* | 2/2015 | Butler | B29C 67/0088 700/119 |
| 2015/0130117 A1* | 5/2015 | Lacaze | B29C 70/681 264/482 |
| 2017/0173888 A1* | 6/2017 | Thomas-Lepore | G06F 21/31 |
| 2017/0173889 A1* | 6/2017 | Thomas-Lepore | G06F 21/31 |
| 2018/0165730 A1* | 6/2018 | Norman | G06Q 30/06 |

* cited by examiner

|  | P1 | P3 | P7 |
|---|---|---|---|
| Slot 4 | | | |
| Slot 3 | | | |
| Slot 2 | | | |
| Slot 1 | | | |

FIG. 1

SYSTEMS AND METHODS FOR PLANNING PRINTING OF THREE-DIMENSIONAL OBJECTS

CROSS-REFERENCE TO RELATED APPLICATIONS

This application claims the benefit under 35 U.S.C. § 119(e) of U.S. Provisional Application Ser. No. 62/402,788, entitled "SYSTEMS AND METHODS FOR PLANNING PRINTING OF THREE-DIMENSIONAL OBJECTS" filed on Sep. 30, 2016, which is herein incorporated by reference in its entirety.

FIELD

Aspects of the technology described herein relate to three-dimensional (3D) printing. Some aspects relate to techniques for automated planning of printer trays for one or multiple 3D printers.

BACKGROUND

Some three-dimensional printing techniques, such as selective laser sintering (SLS), may involve: (1) planning a printer tray for a 3D printer for printing one or more 3D objects; (2) using the 3D printer to print the 3D object(s); (3) cooling the printer tray; (4) extracting the printed 3D objects from the printer tray; and (5) post-processing one or more of the extracted 3D objects (e.g., by dyeing or tumbling). When a printer tray includes multiple printed 3D objects, the printed 3D objects may be sorted to determine which customer(s) ordered the 3D objects. The printed 3D object(s) may be provided to the customer(s) who ordered the 3D object(s).

Planning a printer tray for a 3D printer may involve identifying a set of 3D objects to print in the printer tray and creating a packing plan specifying where in the printer tray each of the 3D objects in the set is to be printed.

SUMMARY

Some embodiments are directed to a system for planning printing of three-dimensional (3D) objects. The system comprises at least one computer hardware processor, and at least one non-transitory computer-readable storage medium storing processor-executable instructions that, when executed by the at least one computer hardware processor, cause the at least one computer hardware processor to perform acts of: accessing information specifying a plurality of 3D objects to be printed using at least one 3D printer, the at least one 3D printer including a first 3D printer; determining a priority for each of at least some of the plurality 3D objects to obtain determined 3D object priorities; assigning, based on the determined 3D object priorities, a subset of the plurality of 3D objects to a first printer tray adapted for use with the first 3D printer; and obtaining a packing plan indicating an arrangement of the subset of the 3D objects within the first printer tray.

Some embodiments are directed to a method for planning printing of three-dimensional (3D) objects. The method comprises using at least one computer hardware processor to perform: accessing information specifying a plurality of 3D objects to be printed using at least one 3D printer, the at least one 3D printer including a first 3D printer; determining a priority for each of at least some of the plurality 3D objects to obtain determined 3D object priorities; assigning, based on the determined 3D object priorities, a subset of the plurality of 3D objects to a first printer tray adapted for use with the first 3D printer; and obtaining a packing plan indicating an arrangement of the subset of the 3D objects within the first printer tray.

Some embodiments are directed to at least one non-transitory computer-readable storage medium storing processor-executable instructions that, when executed by the at least one computer hardware processor, cause the at least one computer hardware processor to perform a method of planning printing of three-dimensional (3D) objects. The method comprises: accessing information specifying a plurality of 3D objects to be printed using at least one 3D printer, the at least one 3D printer including a first 3D printer; determining a priority for each of at least some of the plurality 3D objects to obtain determined 3D object priorities; assigning, based on the determined 3D object priorities, a subset of the plurality of 3D objects to a first printer tray adapted for use with the first 3D printer; and obtaining a packing plan indicating an arrangement of the subset of the 3D objects within the first printer tray.

BRIEF DESCRIPTION OF DRAWINGS

Various aspects and embodiments will be described with reference to the following figures. The figures are not necessarily drawn to scale.

FIG. 1 is a diagram of illustrating example queues for a respective plurality of 3D printers, in accordance with some embodiments of the technology described herein.

DETAILED DESCRIPTION

Figure 2:
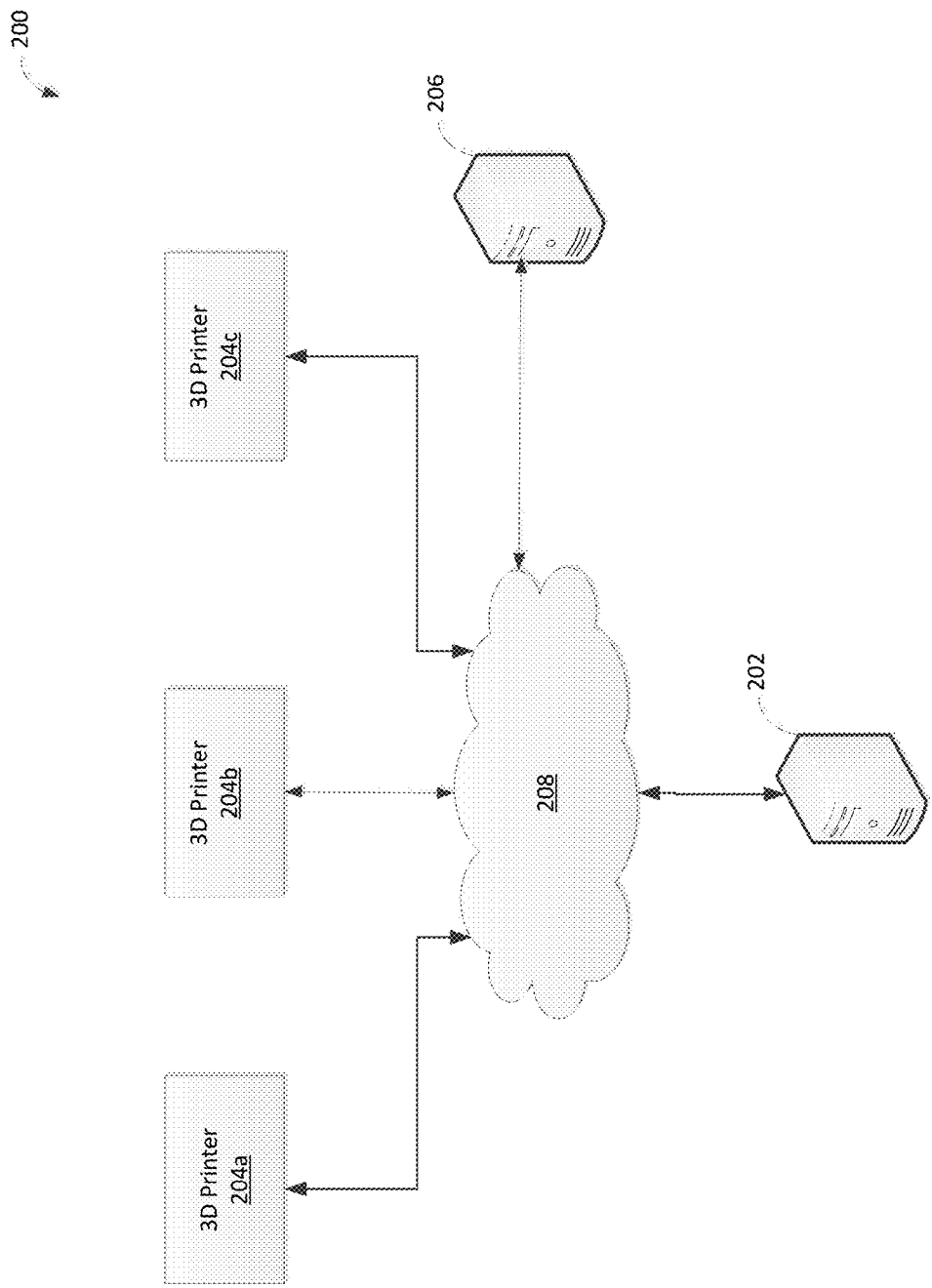
FIG. 2 is a block diagram of an illustrative environment in which some embodiments of the technology described herein may operate.

Conventional techniques for planning a printer tray for a 3D printer involve manually identifying a set of 3D objects to print in the printer tray (e.g., by having a person manually select, in a graphical user interface, each object to be printed in the printer tray) and using statistical packing software to create a packing plan specifying where in the printer tray each of the manually-selected 3D objects is to be printed. The inventors have recognized that such conventional techniques for planning printer trays for 3D printers may be improved upon.

One issue with such conventional techniques for planning printer trays for 3D printers is that they are focused on packing printer trays as densely as possible, but they neither determine nor account for the priority of printing various 3D objects. On the other hand, different 3D objects may be associated with different printing priorities. For example, one 3D object may have a higher printing priority than another 3D object because the customer who ordered the 3D object expects its delivery earlier than the date by which delivery of the other 3D object is expected by the customer who ordered it. As another example, one 3D object may have a higher printing priority than another 3D object because it takes a longer time to manufacture than the other 3D object (e.g., because it is larger, takes longer to cool, may need to be post processed, and/or for any other suitable reason(s)). As yet another example, one 3D object may have a higher printing priority than another 3D object because a customer paid to have its manufacturing expedited. Regardless of the reason for why 3D objects may have different printing priorities (which reasons may include one or more of the above reasons and/or any other reason(s)), the inventors have appreciated that such printing priorities are not taken into account by conventional techniques for planning printer trays for 3D printers. Accordingly, some embodiments of the technology described herein are directed to determining printing priorities for 3D objects and planning printer trays for 3D printers using the determined printing priorities.

Another issue with the above-described conventional techniques for planning printer trays for 3D printers is that they are time-consuming and expensive because they require a significant manual effort in order to identify which 3D objects to print in each of multiple printer trays being planned. A printing facility may operate multiple 3D printers (e.g., at least two, at least five, at least ten, at least twenty, etc.) and each of the multiple 3D printers may print one or multiple printer trays. Consequently, many printer trays must be planned every day for a particular printing facility. On the other hand, it may take an operator multiple hours to plan a single printer tray. Such a manual planning effort is not only expensive, but also does not scale and is prone to human error. Accordingly, some embodiments of the technology described herein are directed to automated planning of printer trays for 3D printers.

Some embodiments described herein address all of the above-described issues that the inventors have recognized with conventional techniques for planning printer trays for 3D printers. However, not every embodiment described below addresses every one of these issues, and some embodiments may not address any of them. As such, it should be appreciated that embodiments of the technology described herein are not limited to addressing all or any of the above-discussed issues of conventional techniques for planning printer trays for 3D printers.

Accordingly, some embodiments are directed to techniques for planning printing of three-dimensional objects. The techniques may include: (1) accessing information specifying multiple 3D objects to be printed using one or more 3D printers; (2) determining a priority for each of multiple 3D objects to obtain determined 3D object priorities; (3) assigning, based on the determined 3D object priorities, a subset of the multiple 3D objects to a printer tray for a 3D printer; and (4) obtaining a packing plan indicating an arrangement of the subset of the 3D objects within the printer tray. Information identifying one or more 3D objects to be printed using the printer tray and a packing plan indicating an arrangement in which the 3D object(s) are to be printed within the printer tray together constitute at least a part of a printing plan for the printer tray. A 3D printer may then print the subset of the 3D objects in the first printer tray in accordance with the printing plan.

In some embodiments, the priority for a 3D object may be determined based, at least in part, on an amount of time it takes to manufacture the 3D object. For example, the priority for a 3D object may be determined based on a printing time of the printer tray that will be used to print the 3D object. As another example, the priority for the 3D object may be determined based on a cooling time of the printer tray that will be used to print the 3D object. As another example, the priority for the 3D object may be determined based on whether any post-printing processing (e.g., dyeing, polishing, smoothing, etc.) is to be performed on the 3D object. As another example, the priority for the 3D object may be determined based on the number of already-planned trays for the printer for which the tray, used for printing the 3D object, is being planned (e.g., the longer the queue of planned trays for a particular 3D printer, the longer it may take to print the 3D object using the particular 3D printer). As another example, the priority for the 3D object may be determined based on the schedule of a 3D printer (e.g., a printer may not be operated in the middle of the night so that if a printer tray is planned, for instance, after 6 pm on a given day, it may not be loaded into the printer for printing until the following day). It should be appreciated that, the priority for the 3D object may be determined based on any suitable combination of factors that influence the amount of time that it takes to manufacture the 3D object including, but not limited to, the above-described factors.

In some embodiments, the priority for a 3D object may be determined based on any other suitable factors in addition to or instead of factors that affect the amount of time that it takes to manufacture a 3D object. For example, in some embodiments, the priority for a 3D object may be determined based on a time by which a customer has indicated that the customer desires to receive the 3D object. For instance, the priority for a 3D object may be determined based on when the priority is being determined relative to the time by which a customer who ordered the 3D object expects to receive the 3D object (e.g., based on a time until a deadline for a customer). As another example, the priority for a 3D object may be determined based on whether a customer paid to expedite manufacturing of the 3D object. It should be appreciated that the printing priority of a 3D object may be determined in any other suitable way, as aspects of the technology described herein are not limited in this respect.

In some embodiments, obtaining a packing plan indicating an arrangement of the subset of the 3D objects within a printer tray may include determining the arrangement of the subset of the 3D objects with the printer tray. This may be done in any suitable way. For example, in some embodiments, the arrangement of the subset of the 3D objects within the printer tray may be determined using software, deployed locally or remotely (e.g., in the cloud), for determining the packing of objects in a volume. For example, in some embodiments, the arrange of the subset of the 3D objects may be determined using the AUTODESK® NETFABB® software.

In some embodiments, when an obtained packing plan for a printer tray indicates that there is space for at least additional 3D object in the printer tray, one or more additional 3D objects may be automatically assigned to the printer tray and an updated packing plan may be generated. The updated packing plan may indicate an arrangement of the subset of the 3D objects and the additional 3D object(s) in the printer tray.

In some embodiments, an already-created printing plan for a printer tray that has not yet been printed, may be selected for improvement. In some embodiments, the planning system may: (1) select, from among the already-planned printer trays, a planned printer tray associated with a previously-generated printing plan, the previously-generated printing plan specifying one or more 3D objects to be printed in the printer tray and a packing plan for these 3D object(s); (2) generate a new printing plan for the selected printer tray; (3) determine whether the new printing plan is an improvement over the previously-generated printing plan; and (4) when it is determined that the new printing plan is an improvement over the previously-generated printing plan, replace the previously-generated printing plan with the new printing plan.

In some embodiments, generating a new printing plan for a printer tray may include releasing all the 3D objects assigned to the printer tray according to the previous printing plan, assigning a new set of 3D objects to the tray based on their respective priorities, and obtaining a new packing plan specifying an arrangement of the new set of 3D objects within the printer tray. The new printing plan will then include information indicating the new set of 3D objects assigned to the printer tray and the new packing plan.

The determination of whether the new printing plan is an improvement over the previous printing plan may be made in any of numerous ways. In some embodiments, determining whether the new printing plan is an improvement over the previously-generated printing plan comprises determining whether the new printing plan provides for printing a greater number of 3D objects than the previously-generated printing plan. In some embodiments, determining whether the new printing plan is an improvement over the previously-generated printing plan comprises determining whether the new printing plan has a greater density of 3D objects than the previously-generated printing plan. In some embodiments, determining whether the new printing plan is an improvement over the previously-generated printing plan comprises determining whether the revenue and/or profits associated with the new printing plan is greater than the revenue and/or profits associated with the previously-generated printing plan.

In some embodiments, after a printing plan for a tray is generated and before a tray is printed according to the printing plan, the printing plan may be checked to determine whether printing according to the printing plan should proceed. The determination of whether to proceed with the printing may be made in any suitable way. For example, in some embodiments, the printing plan may be checked to determine whether to proceed with printing the tray based on revenue associated with printing the 3D objects identified in the printing plan. As another example, in some embodiments, the printing plan may be checked to determine whether to proceed with printing the tray based on profit associated with printing the 3D objects identified in the printing plan. These and/or other criteria may be used for determining whether to proceed with printing of a 3D tray, in some embodiments.

In some embodiments, the system for planning printing of 3D objects may be configured to plan multiple trays for multiple 3D printers. To this end, the system may be configured to: (1) determine priorities for 3D objects; (2) assign, based on the determined priorities, 3D objects to multiple printer trays; and (3) obtain a packing plan for each of the multiple printer trays, each of the packing plans indicating an arrangement of 3D objects within a respective printer tray. The priorities for the 3D objects (and therefore the assignment of the 3D objects to printer trays) may be determined based in any of the ways described herein (e.g., based on factor related to manufacturing time of the 3D objects, deadlines imposed by customers ordering the 3D objects, 3D printer schedules, size restrictions associated with the trays because the size of certain objects may dictate the type of printer tray the parts can and cannot be printed in, etc.).

In some embodiments, the system for planning printing of 3D objects may maintain a queue of planned trays for each of multiple 3D printers. For example, a printing facility may contain multiple printers (e.g., a small printer configured to print using a small tray, a medium printer configured to print using a medium-sized tray, and a large printer configured to print using a large printer tray), and the system for planning printing of 3D objects may maintain a queue of planned trays for each of these three printers. It should be appreciated, however, that the system for planning printing may maintain queues for any suitable number of printers, as aspects of the technology described herein is not limited in this respect. In addition, the system for planning printing of 3D objects is not limited to maintaining queues of planned trays for a single printing facility and may, in some embodiments, maintain queues of planned for any suitable number of 3D printers at any suitable number of printing facilities.

Figure 1:
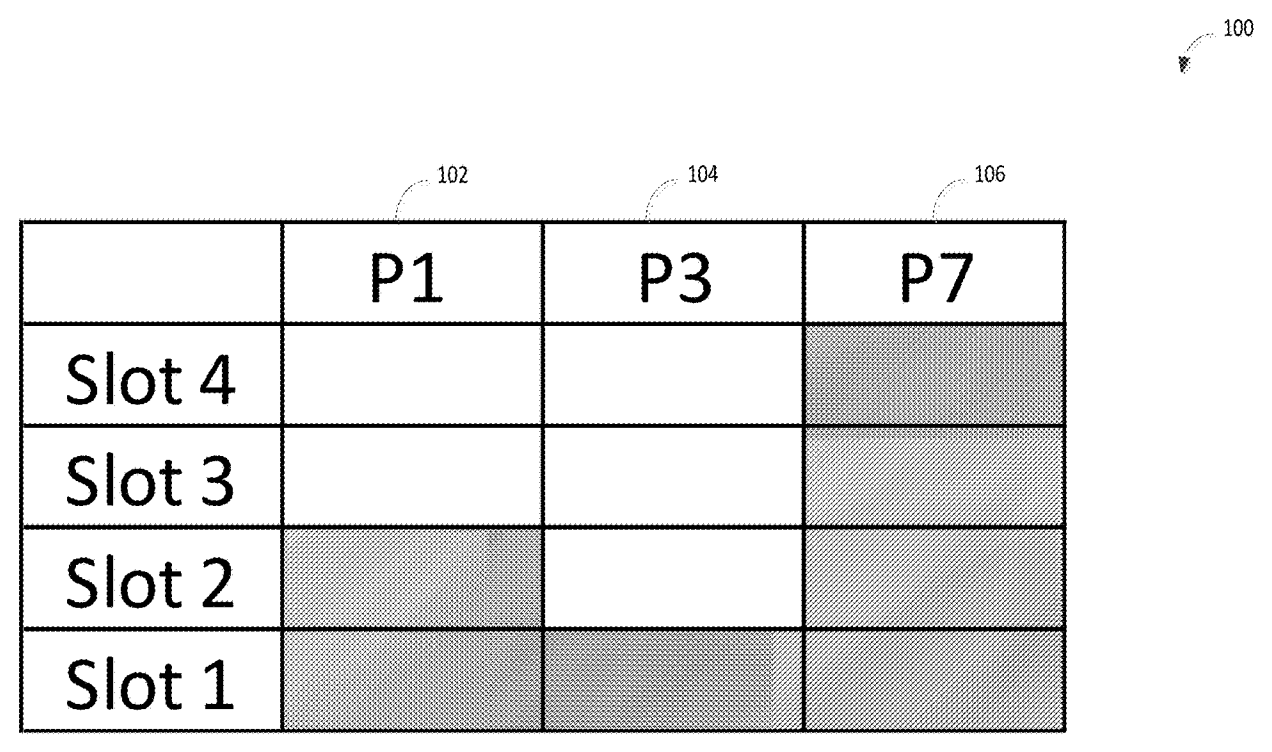

For example, as shown in FIG. 1, the system for planning printing of 3D objects may maintain a master queue 100 that includes a queue 102 of planned trays for a printer (P1) configured to print using a small printer tray, a queue 104 of planned trays for a printer (P3) configured to print using a medium-sized printer tray, and a queue 106 of planned trays for a printer (P7) configured to print using a large printer tray. In this example, each of queues 102, 104, and 106 may include up to four printing plans for its respective printer. Each shaded slot in FIG. 1 indicates that a printer tray has been planned for that slot. Thus, in the illustrative example of FIG. 1, it can be seen that two trays have been planned for printer P1, one tray has been planned for printer P3, and four trays have been planned for printer P7. It should be appreciated, however, that a queue for a printer may be configured to have any suitable number of printing plans and different queues may have different numbers of printing plans, as aspects of the technology described herein are not limited in this respect. Each queue may impose an order in which printing plans are used to print trays by the corresponding 3D printer. A printing plan at the front of a queue (e.g., in slot 1 of the queue 102) may be printed by a 3D printer (e.g., printer P1) before a printing plan behind the front of the queue (e.g., in slot 2 of the queue 102). In some embodiments, a queue may be implemented using any suitable data structure(s), as aspects of the technology described herein are not limited in this respect.

Following below are more detailed descriptions of various concepts related to, and embodiments of, techniques of planning printing of 3D objects. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 2 is a block diagram of an illustrative environment 200 in which embodiments of the technology described herein may operate. Illustrative environment 200 includes a system 202 for planning printing of 3D objects, 3D printers 204a, 204b, and 204c, and remote system 206 configured to generate packing plans for 3D printer trays. System 202, printers 204a, 204b, and 204c, and remote system 206 are communicatively coupled via network 208. Network 208 may be any suitable type of network such as a local area network, a wide area network, the Internet, an intranet, or any other suitable network.

System 202 may be configured to plan one or more printer trays for each of 3D printers 204a, 204b, and 204c. When planning a printer tray for a 3D printer (e.g., 3D printer 204a, 204b, or 204c), system 202 may be configured to: (1) access information specifying multiple 3D objects to be printed using one or more 3D printers (e.g., from a pool of 3D objects to be printed, which for example, may be maintained in a data source part of or communicatively coupled to system 202); (2) determine a priority for each of multiple 3D objects to obtain determined 3D object priorities; (3) assign, based on the determined 3D object priorities, a subset of the multiple 3D objects to a printer tray for the 3D printer; and (4) obtain a packing plan indicating an arrangement of the subset of the 3D objects within the printer tray. In this way, system 202 may be configured to generate a printing plan for a printer tray, the printing plan including information identifying one or more 3D objects to be printed using the printer tray and a packing plan indicating an arrangement in which the 3D object(s) are to be printed within the printer tray. After a printing plan is generated, system 202 may cause a 3D printer to begin printing 3D objects in a printer tray in accordance with the printing plan.

In some embodiments, system 202 may be configured to obtain a packing plan indicating the arrangement of the subset of the 3D objects using remote system 206. In such embodiments, system 202 may provide system 206 with information about the objects assigned to a printer tray (e.g., information specifying the geometric characteristics of the objects such as, for example, their sizes, dimensions, 3D object models, etc.), and system 206 may determine an arrangement in which the 3D objects are to be printed within the printer tray and provide the determined arrangement to system 202. The system 206 may determine the arrangement in which the 3D objects are to be printed within the printer tray in any suitable way. For example, in some embodiments, system 206 may determine the arrangement in which the 3D objects are to be printed using software for determining the packing of objects in a volume such as, for example, AUTODESK® NETFABB®. In other embodiments, system 202 may be configured to determine the arrangement in which the 3D objects are to be printed within the printer tray without receiving input from system 206.

In some embodiments, system 202 may be configured to maintain a queue of printing plans for each of one or more 3D printers. An illustrative example of such a queue is described above with reference to FIG. 1. For example, system 202 may maintain a queue of printing plans for each of 3D printers 204a, 204b, and 204c. System 202 may be configured to create one or more new printing plans (e.g., as described herein including with reference to FIGS. 4 and 5) and add the new printing plan(s) to a queue of a 3D printer. In some embodiments, system 202 may be configured to remove one or more printing plans from a queue of a 3D printer (e.g., to replan one or more of the printing plans as described herein including with reference to FIG. 6). In some embodiments, system 202 may be configured to change the order of printing plans in the queue, for example in response to a determination that one printing plan in the queue has a higher priority than another printing plan in the queue.

System 202 may be implemented in any suitable way using hardware, software, or any suitable combination of hardware and software. System 202 may comprise one or multiple computing devices each of which may include one or multiple computer hardware processors. Each computing device may be fixed (e.g., a desktop, a server, a rack-mounted device, etc.) or portable (e.g., a laptop, a mobile device, a tablet, etc.), as aspects of the technology described herein are not limited in this respect. Additional aspects of system 202 are described herein including with reference to FIGS. 3-6. System 206 may be implemented using one or multiple computing devices and, in some embodiments, may be implemented using software executing in a cloud computing system.

Each of printers 204a, 204b, and 204c may be any suitable type of 3D printer and may be configured to perform 3D printing using any of numerous types of technologies. For example, 3D printer 204a may be configured to print 3D objects using selective laser sintering (SLS), electronic beam melting (EBM), selective laser melting (SLM), any 3D printing technique that is used to form 3D objects from printer trays filled with powder, and/or any other suitable 3D printing technique. Similarly, each of 3D printers 204b and 204c may be configured to print 3D objects using SLS, EBM, SLM, and/or any other suitable 3D printing technique. It should be appreciated that although only three 3D printers are illustrated in environment 200, this is merely for clarity of presentation and not by way of limitation, as aspects of the technology described herein are not limited in this respect. As described above, system 202 may be configured to plan multiple printer trays for any suitable number of 3D printers located at any suitable number of printing facilities or other locations.

Figure 3:
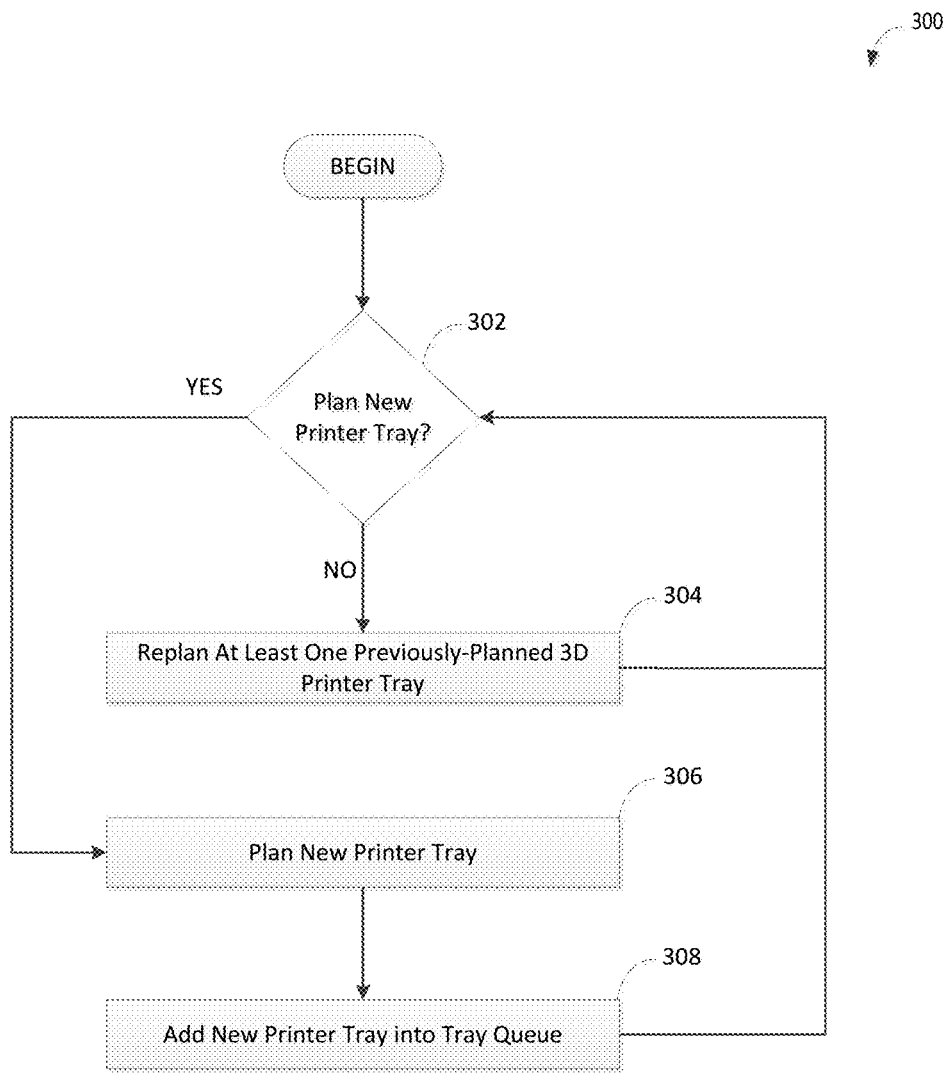
FIG. 3 is a flowchart of an illustrative process for determining whether to plan a new printer tray for a 3D printer or to replan at least one previously-planned printer tray, in accordance with some embodiments of the technology described herein.

FIG. 3 is a flowchart of an illustrative process 300 for determining whether to plan a new printer tray for a 3D printer or to replan (e.g., optimize contents of) at least one previously-planned printer tray, in accordance with some embodiments of the technology described herein. Process 300 may be executed by any suitable computing device(s) and, in some embodiments, may be executed by system 202 for planning printing of 3D objects described above with reference to FIG. 2.

Process 300 begins at decision block 302, where the system executing process 300 determines whether a new printer tray is to be planned for a 3D printer. This determination may be made in any suitable way. For example, in some embodiments, the system executing process 300 is configured to have at least a threshold number of printer trays planned for a 3D printer. Thus, a determination to plan a new printer tray may be made when there are fewer than the threshold number of printer trays planned for the 3D printer. As another example, the system executing process 300 may maintain a queue of planned printer trays for each of one or multiple 3D printers and may make a determination to plan a new printer tray when at least one slot in at least one of the queues is empty in that there is not a planned printer tray associated with the slot. For instance, the system executing process 300 may access master queue 100 and determine that a new printer tray is to be planned for printer P1 (e.g., because there are two empty slots in the queue 102) or that a new printer tray is to be planned for printer P3 (e.g., because there are three empty slots in queue 104), but that no new printer tray is to be planned for printer P7 because the queue 106 is full and does not have any empty slots. As yet another example, the arrival of a new rush order may trigger the planning of a new tray to include the object(s) ordered as part of the rush order.

When it is determined, at decision block 302, that a new printer tray is to be planned for a 3D printer, process 300 proceeds, via the YES branch, to act 306, where a new printer tray is planned. On the other hand, when it is determined, at decision block 302, that a new printer tray is not to be planned, process 300 proceeds, via the NO branch, to act 304, where one or more previously-planned 3D printer trays may be replanned.

One or more previously-planned 3D printer trays may be replanned, at act 304, in any suitable way. In some embodiments, for example, a previously-planned 3D printer tray may be replanned by accessing the current printing plan for the printer tray, storing the current printing plan, releasing objects assigned to the tray in the current printing plan to the general pool of objects that are to be printed in some 3D printer tray, and generating a new printing plan for the tray. After the new printing plan is generated, it may be compared to the current printing plan, which was stored in part for the purpose of performing such a comparison, and may replace the current printing plan should a determination be made that the new printing plan sufficiently improves upon the current printing plan in some respect(s). Aspects of replanning one or multiple printer trays are described in more detail herein including with reference to FIG. 6 that shows an illustrative process 600 for replanning a printer tray. After one or multiple printer trays are replanned, at act 304, process 300 returns to decision block 302 to determine whether to plan another new printer tray.

A new printer tray may be planned, at act 306, in any suitable way. In some embodiments, for example, a new printer tray may be planned by accessing information specifying one or more 3D objects to be printed, determining priority for at least some of these 3D objects, assigning a subset of the 3D objects to the printer tray being planned, and determining a packing plan for the assigned subset of the 3D objects that specifies an arrangement in which the subset of the 3D objects are to be printed within the printer tray. Aspects of planning a new printer tray is described in more detail herein including with reference to FIGS. 4 and 5 that show illustrative processes 400 and 500, respectively, for planning new printer trays.

After the new printer tray is planned for a 3D printer, at act 306, the new printer tray may be added to a queue of planned printer trays for the 3D printer. This may be done in any suitable way. For example, information identifying and/or specifying a printing plan for the planned tray may be stored in at least one data structure used to implement a queue of planned printer trays for the 3D printer. It should also be appreciated that the set of planned printer trays for a 3D printer are not limited to being organized using a queue and, in some embodiments, may be organized using any other suitable scheme and/or data structure(s).

In some embodiments, the new printer tray may be added to the end of the queue behind all of the other planned trays for the 3D printer. However, in other embodiments, the new printer tray be added at the front of the queue or at any other suitable location within the queue.

In some embodiments, a priority may be determined for the new printer tray and the new printer tray may be inserted into the queue based on the determined priority. For example, the new printer tray may be added to the queue based on results of comparing the priority determined for the new printer tray to priorities of the other printer trays in the queue. For example, when it is determined that the new printer tray has a higher priority than one or more other printer trays in the queue for the 3D printer, the new printer tray may be added to the queue ahead of the one or more other printer trays. The priority of a new printer tray may be determined in any suitable way. For example, the priority of a new printer tray may be determined based on the printing priority of the 3D objects assigned to the tray. For instance, a new printer tray having one or more objects with higher printing priority that any objects in another printer tray may be determined to have a higher printing priority than the other printer tray and may be placed in the queue ahead of the other printer tray. As another example, the priority of a new printer tray may be determined based on a number of objects assigned to be printed. For instance, a new printer tray having more objects assigned to it may have a higher priority than another printer tray having fewer objects assigned to it and may be placed in the queue ahead of the other printer tray. As another example, the priority of a new printer tray may be determined based on an amount of revenue and/or profit associated with printing the objects assigned to the printer tray. For instance, if a business (e.g., a business operating a 3D printing facility) will generate more revenue and/or profit by printing a new printer tray than another printer tray, then the new printer tray may be determined to have a higher priority than the other printer tray and may be placed in the queue ahead of the other printer tray. After the new printer tray is added to a queue for a 3D printer at act 308, process 300 returns to decision block 302 to determine whether to plan another new printer tray.

Figure 4:
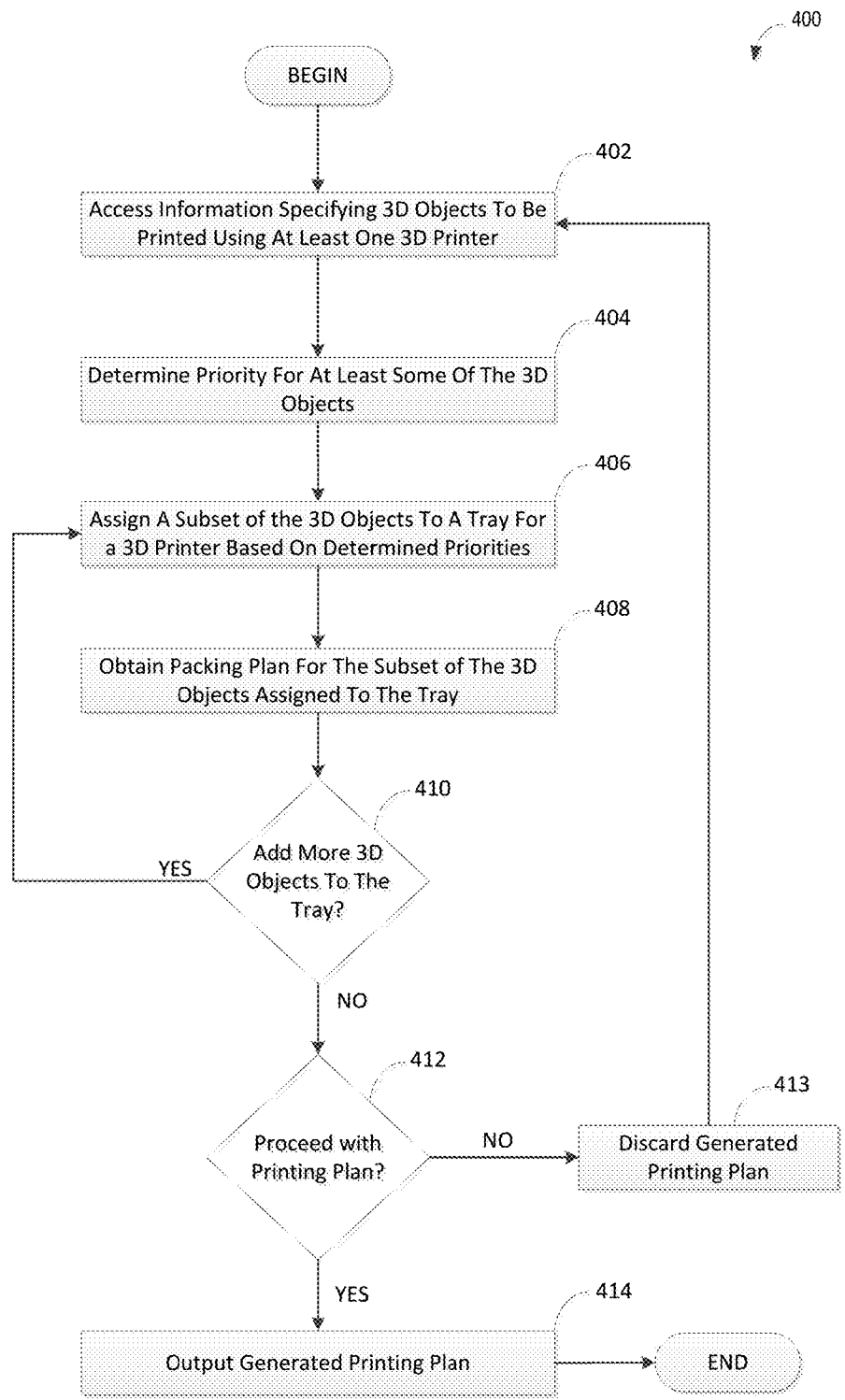
FIG. 4 is a flowchart of an illustrative process for planning a new printer tray for a 3D printer, in accordance with some embodiments of the technology described herein.

FIG. 4 is a flowchart of an illustrative process 400 for planning a new printer tray for a 3D printer, in accordance with some embodiments of the technology described herein. Process 400 may be executed by any suitable computing device(s) and, in some embodiments, may be executed by system 202 for planning printing of 3D objects, which system was described above with reference to FIG. 2.

Process 400 begins at act 402, where the system executing process 400 accesses information specifying 3D objects to be printed using at least one 3D printer. The information may be accessed from any suitable source(s). For example, the information may be accessed from one or multiple data stores (e.g., one or multiple databases) containing information about a pool of 3D objects to be printed. The pool of 3D objects may include one or more objects ordered by one or more customers (e.g., businesses, individuals, and/or any other entities) and/or objects not yet ordered by any customers (e.g., objects that are to be placed on sale). The data store(s) may be co-located with the system executing process 400 or located remotely from the system executing process 400, as aspects of the technology described herein are not limited in this respect.

Any suitable information for a 3D object may be accessed at act 402. For example, information accessed for a 3D object may include information about the shape of a 3D object including, but not limited to, information indicating the size of the object, information indicating dimensions of the object, information indicating dimensions of a bounding box that contains the 3D object, a 3D model of the 3D object, or any suitable combination thereof. As another example, information accessed for a 3D object may include information that may be used to determine the priority of the 3D object including, but not limited to, information directly or indirectly indicating the type of 3D printer to be used for printing the 3D object (e.g., indirect information may include the size of the object which implies the size of a printer tray needed to print it and therefore the type of 3D printer to be used), information indicating whether post-printing processing is to be applied to the 3D object (e.g., tumbling, dyeing, polishing, etc.), information indicating when the 3D object was ordered, information indicating when a customer expects or desires to receive the 3D object, how much a customer paid or will pay for the 3D object, how much profit and/or revenue will be realized by printing the 3D object, and/or any suitable combination thereof.

In some embodiments, information about all 3D objects to be printed is accessed during act 402. In other embodiments, information about only some of the 3D objects to be printed is accessed during act 402. For example, when planning a printer tray for a 3D printer configured to print objects in a printer tray of a particular size, information about only those objects that can be printed by the printer is accessed at act 402. Thus, when planning a printer tray for a 3D printer, information about objects that can fit into the printer tray for the 3D printer may be accessed at act 402, whereas information about objects that cannot fit into the printer tray may not be accessed at act 402. As another example, information about objects that must be printed within a threshold period of time may be accessed at act 402, whereas information about objects that do not need to be printed within the threshold period of time may not be accessed at act 402.

Next, process 400 proceeds to act 404, where the system executing process 400 determines a priority for at least some (e.g., all) of the 3D objects for which information was accessed at act 402. A priority for a 3D object may be determined in any suitable way. In some embodiments, the priority for a 3D object may be determined based, at least in part, on an amount of time it takes to manufacture the 3D object. For example, the priority may be determined based on a printing time of the printer tray that will be used to print the 3D object, a cooling time of the printer tray that will be used to print the 3D object, whether any post-printing processing (e.g., dyeing, polishing, smoothing, etc.) is to be performed on the 3D object, the number of already-planned trays for the printer for which the tray is being planned, the schedule of a 3D printer, any suitable combination thereof, and/or any other factors that influence the amount of time it takes to manufacture the 3D object. Additionally or alternatively, the priority for a 3D object may be determined based on a time by which a customer has indicated that the customer desires to receive the 3D object, whether a customer paid to expedite manufacturing of the 3D object, the amount of profit and/or revenue to be realized by printing the 3D object, whether the 3D object is the subject of a rush order, and/or any suitable combination thereof. It should be appreciated that the printing priority of a 3D object may be determined in any other suitable way, as aspects of the technology described herein are not limited in this respect.

The priorities determined at act 404 may be of any suitable type. In some embodiments, each object may be assigned a priority category from a set of priority categories. The set of priority categories may include any suitable number of categories (e.g., 2, 3, 4, 5, 6, etc.). For example, the set of priority categories may have two categories: high priority and low priority, and each object may be assigned either a high or a low priority. As another example, the set of priority categories may have three priority categories: high priority, medium priority, and low priority, and each object may be assigned a high priority, a medium priority, or a low priority. In some embodiments, each object may be assigned a numeric priority, whereby each object is assigned a number indicating its relative priority. The numbers assigned may be in any suitable range, as aspects of the technology described herein are not limited in this respect.

Next, process 400 proceeds to act 406, where a subset (e.g., some or all) of the 3D objects is assigned to the printer tray being planned based on the priorities determined at act 404. In some embodiments, the objects with the highest priorities may be assigned to the printer tray being planned. Objects with the highest priorities may be assigned to the printer tray such that all or substantially all of the assigned objects may be arranged within the printer tray (e.g., that they may be packed within the printer tray). This may be done in any suitable way. For example, given the size (e.g., volume) of the printer tray being planned, estimates (e.g., bounding box estimates) of the sizes of the 3D objects may be used to determine how many of the highest priority objects may be assigned to a printer tray. As another example, given the size (e.g., volume) of the printer tray being planned, an average size of the 3D objects may be used to determine how many of the highest priority objects may be assigned to a printer tray.

In embodiments where 3D objects are assigned priorities from a set of priority categories, 3D objects having the highest priority are assigned first. If there is room in the printer tray being planned after all highest priority objects have been assigned, then 3D objects having the next highest priority are assigned to the printer tray, and so on. As a specific example, if at act 404 each object is assigned one of three priority categories—high priority, medium priority, and low priority—then one or more of the high priority objects are assigned first to the printer tray being planned. If all the high priority objects have been assigned and there is room in the printer tray being planned, then one or more of the medium priority objects are assigned to the printer tray. If all the medium priority objects have been assigned and there is still room in the printer tray being planned, then one or more of the low priority objects are assigned. In embodiments, where objects are assigned numeric priorities, the objects may be assigned in the order induced by the priority values.

In some embodiments, after a 3D object has been assigned a particular printer tray being planned, that 3D object may be removed from the pool of 3D objects from which printer trays are planned. In this way, the same 3D object is not assigned to two different printer trays. However, when a planned printer tray is discarded (e.g., as described with reference to act 413) or is being replanned (e.g., as described with reference to FIG. 6), the 3D objects assigned to the printer tray may be released back into the pool of 3D objects and may be assigned to one or more new printer trays that are being planned.

Next, process 400 proceeds to act 408, where a packing plan is obtained for the subset of the 3D objects assigned to the printer tray at act 406. In some embodiments, the packing plan may be determined by a system (e.g., system 206) external to the system executing process 400 (e.g., system 202) and may be provided to the system executing process 400 at act 408. In other embodiments, the system executing process 400 may itself determine the packing plan for the subset of objects assigned to the printer tray at act 406. Regardless of which system determines the packing plan, the determination of the packing plan may be performed using any suitable technique for determining the packing of objects in a volume. For example, in some embodiments, software for additive manufacturing such as, for example, AUTODESK® NETFABB® or any other suitable software may be used. The obtained packing plan may specify an arrangement in which the objects assigned to the printer tray are to be printed within the printer tray. The packing plan may specify the arrangement in any suitable way and in any suitable format, as aspects of the technology described herein are not limited in this respect.

Next, process 400 proceeds to decision block 410, where a determination is made, based on the packing plan obtained at act 408, as to whether one or more objects may be added to the printer tray. This determination may be made in any suitable way. For example, the packing plan may provide an indication that there is space in the printer tray to add one or more 3D objects. Additionally, the packing plan may provide an indication of how much free space there may be in the printer tray and/or where that free space is within the printer tray. If such an indication is provided as part of or together with the packing plan, a determination may be made to add one or more 3D objects to the printer tray.

When it is determined, at decision block 410, to add one or more 3D objects to the printer tray, process 400 returns, via the YES branch, to act 406, where one or more additional 3D objects are assigned to the printer tray. The additional objects may be assigned based on information indicating the amount of free space in the printer tray and/or in any other suitable way. Then a new packing plan is generated at act 408 for the previously- and newly-assigned 3D objects. On the other hand, when it is determined at decision block 410, to not add any more objects to the packing plan, process 400 proceeds to decision block 412.

In decision block 412, the system executing process 400 determines whether to proceed with printing of the planned tray. This determination may be made in any suitable way. For example, the system may determine an amount of revenue to be generated by printing a printer tray in accordance with the printing plan—by printing the objects assigned to the printer tray in accordance with the packing plan generated at act 408. When the amount of revenue exceeds a threshold, a determination may be made to proceed with printing of the planned printer tray. As another example, the system may determine to proceed with printing of the planned printer tray when the number of objects assigned to the tray exceeds a threshold number of objects. As yet another example, the system may determine to proceed with printing of the planned printer tray when a profit realized by printing the printer tray exceeds a threshold amount. In some embodiments, the above checks may be performed alone or in any suitable combination. By performing one or more of such checks, the entity operating a 3D printer may determine whether the cost of printing a printer tray (e.g., the cost of the powder in a printer tray, the cost of the manual labor required to load, unload, and cool the printer tray, the cost implied by utilizing a 3D printer for printing this particular planned tray rather than some other tray, etc.) is justified, for example, by the revenue and/or profit realized from the printing.

When it is determined, at decision block 412, not to proceed with the printing plan, the process 400 proceeds, via the NO branch, to act 413, where the generated printing plan is discarded and the objects assigned to the printer tray in the printing plan are released back to the pool of 3D objects, after which the process 400 returns to act 402 to try and plan a printer tray anew. On the other hand, when it is determined, at decision block 412, to proceed with the printing plan, process 400 proceeds, via the YES branch, to act 414, where the generated printing plan is output. The printing plan may include information indicating which 3D objects were assigned to the printer tray that was planned and a packing plan for the assigned objects.

In some embodiments, outputting the generated printing plan includes adding the generated printing plan to a queue (e.g., as described with reference to act 308 of process 300) for the 3D printer for which the printing plan was generated. In some embodiments, outputting the generated printing plan includes saving the generated printing plan for subsequent use (e.g., in a memory or any suitable non-transitory computer-readable storage medium). In some embodiments, outputting the generated printing plan includes presenting the generated printing plan to a human operator for inspection. In some embodiments, outputting the generated printing plan includes causing a 3D printer to print a printer tray in accordance with the printing plan. After the generated printing plan it output, at act 414, process 400 completes.

It should be appreciated that process 400 is illustrative and that there are variations of process 400. For example, although in the illustrated embodiment, printing priorities for 3D objects are determined at act 404, in other embodiments, such priorities may have been determined prior to the execution of process 400 and may be accessed, rather than determined, at act 404.

Figure 5:
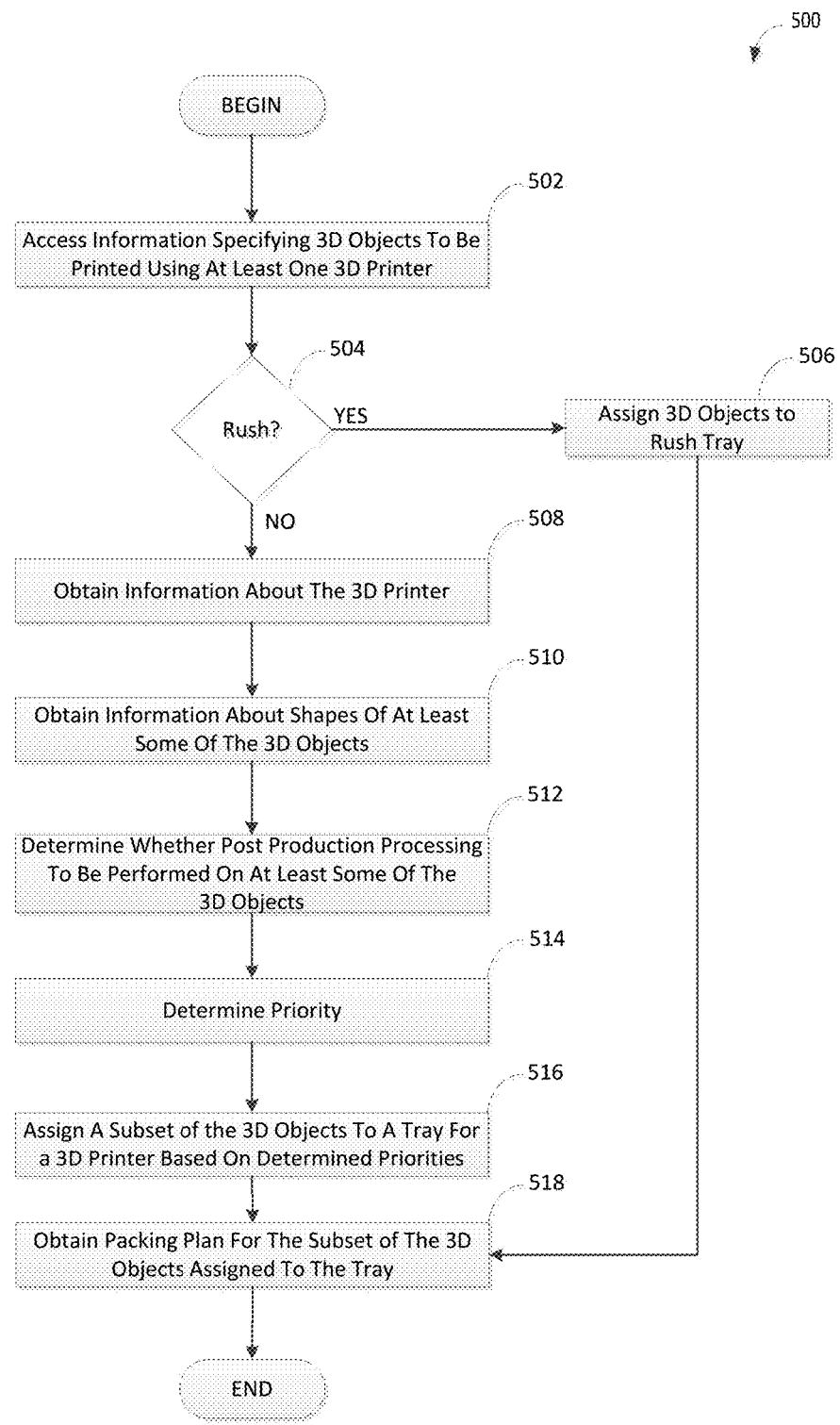
FIG. 5 is a flowchart of another illustrative process for planning a new printer tray for a 3D printer, in accordance with some embodiments of the technology described herein.

FIG. 5 is a flowchart of an illustrative process 500 for planning a new printer tray for a 3D printer, in accordance with some embodiments of the technology described herein. Process 500 may be executed by any suitable computing device(s) and, in some embodiments, may be executed by system 202 for planning printing of 3D objects described above with reference to FIG. 2.

Process 500 begins at act 502, where information specifying 3D objects to be printed using a 3D printer is accessed. The information accessed during act 502 may be any of the information described with reference to act 402 of process 400 and/or any other suitable information, and may be accessed from any suitable source(s) including any of the sources described with reference to act 402 of process 400.

Next, process 500 proceeds to decision block 504, where it is determined whether or not a rush tray is to be planned. The determination of whether a rush tray is to be planned may be made in any suitable way. In some embodiments, it may be determined that a rush tray is to be planned when one or more rush objects have been ordered, but have not yet been assigned to a printer tray. In some embodiments, it may be determined that a rush tray is to be planned when one or more rush objects have been ordered on the same day as the process 500 is being executed and it is after a threshold time (e.g., 2 pm), but the rush object(s) have not yet been assigned to a printer tray. The threshold time may reflect the time by which the ordered rush object(s) must be assigned to a tray so as to ensure that their printing can commence on the same day that they are ordered. It should be appreciated that a determination that a rush tray is to be planned may be made in any other suitable way, as aspects of the technology described herein are not limited in this respect.

When it is determined that a rush tray is to be planned, at decision block 504, process 500 proceeds, via the YES branch, to act 506, where one or more rush objects are assigned to a printer tray. In some instances, the printer tray to which the rush parts are assigned, at act 506, may be the smallest possible printer tray among printer trays that are possible to use for printing 3D objects at a printing facility. In this way, the rush object(s) may be manufactured more quickly, as 3D objects in a smaller printer tray may be printed and cooled faster than in a larger printer tray. After the rush object(s) are assigned to a printer tray, one or more additional objects may be assigned to the printer tray (e.g., based on their respective priorities) if there is additional space in the printer tray.

After 3D objects have been assigned to a printer tray, at act 506, process 500 proceeds to act 518, where a packing plan is generated for the objects assigned to the printer tray. The packing plan may specify an arrangement in which the assigned 3D objects are to be printed within the 3D tray, and may be generated in any of the ways described with reference to act 408 of process 400 or in any other suitable way.

After a packing plan has been generated for the rush tray, the system executing process 500 may schedule the rush printer tray to be printed. This may be done in any suitable way. For example, the system may insert the printing plan for tray at the front of a queue of planned trays for a 3D printer. As another example, the system may alert a human operator that the rush tray is planned and, in response, the human operator may operate the 3D printer to cause the 3D printer to print the rush tray.

On the other hand, when it is determined at decision block 504, that a rush tray is not to be planned, process 500 proceeds, via the NO branch, to acts 508-512, where information used for determining 3D object priorities is obtained, and to act 514, where the information obtained at acts 508-512 is used to determine printing priorities for at least some of the 3D objects about which information was obtained at act 502.

Accordingly, process 500 proceeds next to act 508, where information is obtained about the 3D printer for which a printer tray is being planned. In some embodiments, obtaining information about a 3D printer includes obtaining information about the size of a printer tray(s) used by the 3D printer (e.g., information indicating dimensions of the printer tray, information indicating limits on dimensions of the 3D objects that may be printed in the printer tray). Some types of 3D printers may be configured to print using printer trays of different sizes and information about all such printer trays may be obtained as part of act 508. For example, a 3D printer (e.g., a P7 printer) may be configured to print using printer trays of different heights. Printer trays having larger heights can accommodate the printing of larger 3D objects. In this way, very large objects may be printed using a printer tray having the largest height, but if there are no such objects (or there is only a small number of such objects), then a printer tray of the smaller height may be planned for that particular 3D printer.

In some embodiments, obtaining information about the 3D printer may include obtaining information indicating how much time it takes to manufacture 3D objects using the 3D printer. For example, information about how long it takes to print a printer tray with the 3D printer and/or cool a printer tray printed by the 3D printer may be obtained at act 508, in some embodiments.

Next, process 500 proceeds to act 510, where information about shapes of at least some of the 3D objects are obtained. Obtaining information about the shape of a 3D object may include, but is not limited to, obtaining information indicating the size of the object, information indicating dimensions of the object, information indicating dimensions of a bounding box that contains the 3D object, a 3D model of the 3D object, or any suitable combination thereof.

In some embodiments, when process 500 is being used to plan a printer tray for a 3D printer that can print using different types of printer trays, the size of the printer tray to plan may be determined based, at least in part, on information about the shape of the 3D objects obtained at act 510. For example, when a 3D printer may be configured to print using two types of trays: Type I and Type II, with a Type II tray having a larger height than a Type I tray, a determination to use a Type II tray may be made based, at least in part, on the information about the shape of the 3D objects. For example, a determination to use a Type II tray may be made when there is at least one (or at least a threshold number) of 3D objects requiring the larger height Type II tray to be scheduled for printing. The threshold number may be set to greater than one such that as many very large objects are printed together as possible.

Next, process 500 proceeds to at act 512, where it is determined which of the objects, if any, need to undergo post-printing processing. Non-limiting examples of post-printing processing include dyeing, tumbling, and polishing. This determination may be made in any suitable way, for example, by accessing order information to determine whether any of the 3D objects are to undergo post-printing processing. This determination is important because post-printing processing increases the amount of manufacturing time for an object and should be taken into account when determining the object's printing priority.

Next, process 500 proceeds to act 514, where a printing priority for at least some of the 3D objects is determined using the information obtained at acts 508-512. The printing priority may be determined in any suitable way including in any of the ways described with reference to act 404 of process 400. In some embodiments, for example, the printing priority of a 3D object may be determined using an estimate of how long it will take to manufacture a 3D object in the planned printer tray, which estimate may be obtained based on the information obtained at acts 508-512 (e.g., size of printer tray, printing time for printer tray, cooling time for tray, and whether the 3D object is to undergo post-printing processing). The estimate of the time it will take to manufacture a 3D object may be compared with a deadline for completing the manufacture/delivery of the 3D object, which deadline may be imposed by a customer who ordered the 3D object or in any other way, and the result of the comparison may be used to determine a priority for the 3D object. For example, the smaller the difference between the deadline for manufacturing/delivering the 3D object and the time needed for manufacturing the 3D object, the higher the printing priority for the 3D object. It should be appreciated that the printing priority for a 3D object is not limited to being determined solely based on an estimate of time needed for manufacturing the 3D object and, additionally or alternatively, may be determined using one or more other criteria, examples of which are provided herein.

Next, process 500 proceeds to act 516, where a subset (e.g., some or all) of the 3D objects is assigned to the printer tray being planned based on the priorities determined at act 514. This may be done in any suitable way including any of the ways described above with reference to act 406 of process 400.

Next, process 500 proceeds to act 518, where a packing plan is generated for the objects assigned to the printer tray. As described above, the packing plan may specify an arrangement in which the assigned 3D objects are to be printed within the 3D tray, and may be generated in any of the ways described with reference to act 408 of process 400 or in any other suitable way. After act 518, process 500 completes.

It should be appreciated that process 500 is illustrative and that there are variations of process 500. For example, process 500 may be modified by including one or more acts to determine whether one or more additional 3D objects may be added to the planned 3D tray, for example, as described with reference to decision block 410 of process 400. Additionally or alternatively, process 500 may be modified by including one or more acts to determine whether to proceed with the printing plan for the planned tray, for example, as described with reference to decision block 412 and act 413 of process 400.

Figure 6:
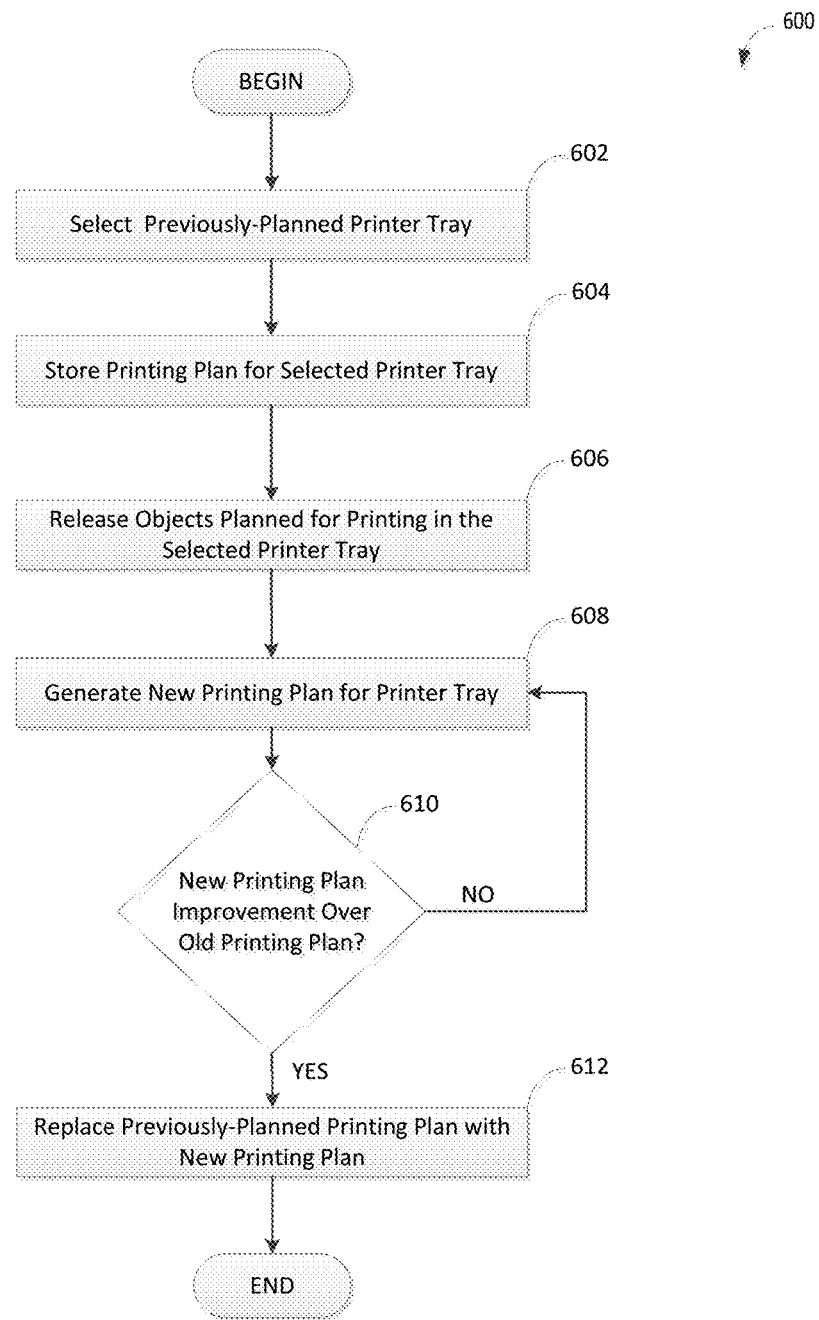
FIG. 6 is a flowchart of an illustrative process for replanning one or more printer trays for at least one 3D printer, in accordance with some embodiments of the technology described herein.

FIG. 6 is a flowchart of an illustrative process 600 for replanning at least one printer tray for at least one 3D printer, in accordance with some embodiments of the technology described herein. Process 600 may be executed by any suitable computing device(s) and, in some embodiments, may be executed by system 202 for planning printing of 3D objects described above with reference to FIG. 2. Process 600 may be launched by the system for planning printing of 3D objects during execution of process 300 or in any other suitable way.

Process 600 begins at act 602, where a previously-planned printer tray is selected. The previously-planned printer tray may be selected for replanning in any suitable way. For example, in embodiments, where printer trays are associated with respective priorities, the lowest priority printer tray may be selected for replanning at act 602. In this way, in some instances, the printer tray that was to be used for printing the lowest priority objects (among those scheduled for printing) may be selected for replanning. As another example, a printer tray to which the smallest number of objects has been assigned for printing may be selected at act 602. As another example, a printer tray associated with the lowest profit and/or revenue, among the already planned printer trays, may be selected for replanning at act 602.

Next, at act 604, the printing plan for the selected printer tray may be accessed and stored. The printing plan may include information identifying the 3D objects assigned to the planned printer tray and a packing plan indicating an arrangement in which the 3D objects are to be printed within the printer tray. The printing plan may be stored in any suitable storage medium in any suitable format, as aspects of the technology described herein are not limited in this respect.

Next, at act 606, the objects assigned to the selected printer tray are released to the pool of 3D objects from which trays are planned. Process 600 then proceeds to act 608, where a new printing plan for the printer tray is generated. The new printing plan may include some, none, or all of the 3D objects assigned to the previously-planned printer tray. The new printing plan may be generated in any suitable way including, for example, in accordance with process 400 or process 500.

Next, process 600 proceeds to decision block 610, where it is determined whether the new printing plan, generated at act 608, is an improvement over the previously-generated printing plan. This determination may be made in any suitable way. For example, determining whether the new printing plan is an improvement over the previously-generated printing plan may include determining whether the new printing plan provides for printing a greater number of 3D objects than the previously-generated printing plan. As another example, determining whether the new printing plan is an improvement over the previously-generated printing plan may include determining whether the new printing plan has a greater density of 3D objects than the previously-generated printing plan. As yet another example, determining whether the new printing plan is an improvement over the previously-generated printing plan may include determining whether the revenue and/or profits associated with the new printing plan is greater than the revenue and/or profits associated with the previously-generated printing plan. In some embodiments, any suitable combination of the aforementioned criteria and/or any other suitable criteria may be used to determine whether the new printing plan is an improvement over the previously-generated printing plan.

When it is determined, at decision block 610, that the new printing plan is not an improvement over the previously-generated printing plan, process 600 returns, via the NO branch, to act 608, where another new printing plan is generated. In some instances, once the NO loop has been followed a threshold number of times, such that multiple new printing plans have been generated with none of them constituting an improvement over the previously-generated printing plan, the previously-generated printing plan may be added back to the queue (to the slot to which it was previously assigned or to another slot) and process 600 completes.

On the other hand, when it is determined, at decision block 610, that the new printing plan is an improvement over the previously-generated printing plan, process 600 proceeds to act 612, where the new printing plan may be added to the queue (to the slot where the previously-generated printing plan was assigned or to another slot), the previously-generated printing plan may be discarded, and process 600 completes.

It should be appreciated that process 600 is illustrative and that there are variations of process 600. For example, in some embodiments, multiple previously-planned trays may be selected for replanning. In such embodiments, the objects assigned to all these trays may be released to the pool of objects, and new trays may be planned to replace each of the multiple selected trays. Such optimization may be more computationally intensive to perform, but there may be situations (e.g., in the middle of the night when no 3D printers are running) when there is time to perform such multi-tray optimizations.

Figure 7:
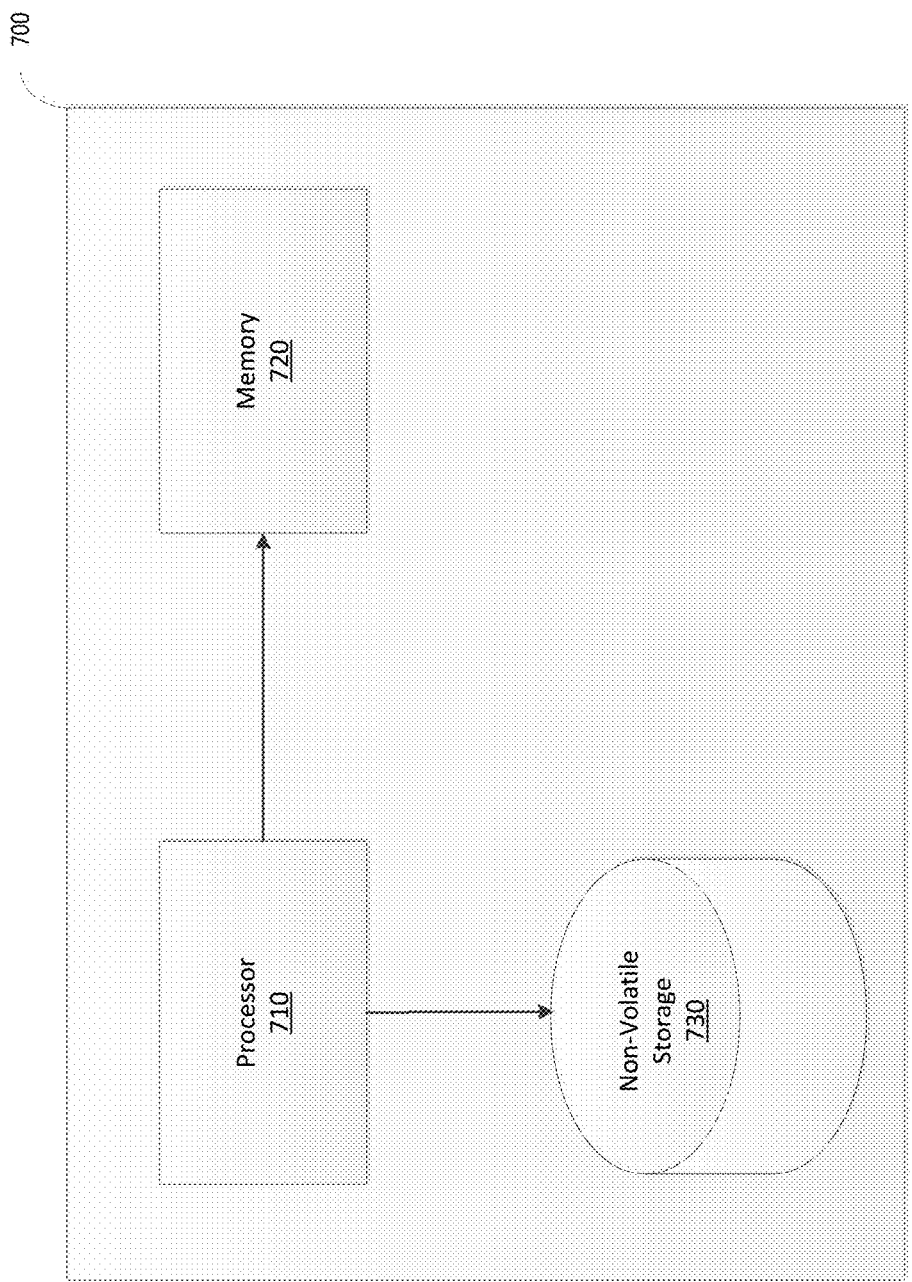
FIG. 7 is a block diagram of an illustrative computer system that may be used in implementing some embodiments of the technology described herein.

An illustrative implementation of a computer system 700 that may be used in connection with any of the embodiments of the disclosure provided herein is shown in FIG. 7. The computer system 700 may include one or more processors 710 and one or more articles of manufacture that comprise non-transitory computer-readable storage media (e.g., memory 720 and one or more non-volatile storage media 730). The processor 710 may control writing data to and reading data from the memory 720 and the non-volatile storage device 730 in any suitable manner, as the aspects of the disclosure provided herein are not limited in this respect. To perform any of the functionality described herein, the processor 710 may execute one or more processor-executable instructions stored in one or more non-transitory computer-readable storage media (e.g., the memory 720), which may serve as non-transitory computer-readable storage media storing processor-executable instructions for execution by the processor 710.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for planning printing of three-dimensional (3D) objects, the system comprising:
    at least one computer hardware processor; and
    at least one non-transitory computer-readable storage medium storing processor-executable instructions that, when executed by the at least one computer hardware processor, cause the at least one computer hardware processor to perform acts of:
        accessing information specifying a plurality of 3D objects to be printed using at least one 3D printer, the at least one 3D printer including a first 3D printer;
        determining a priority for each of at least some of the plurality 3D objects to obtain determined 3D object priorities;
        assigning, based on the determined 3D object priorities, a subset of the plurality of 3D objects to a first printer tray adapted for use with the first 3D printer;
        obtaining a packing plan indicating an arrangement of the subset of the 3D objects within the first printer tray;
        identifying a plurality of planned trays associated with the first 3D printer, each of the plurality of planned trays being associated with a respective printing plan;
        selecting, from the plurality of planned trays, a planned tray associated with a previously-generated printing plan, the previously-generated printing plan specifying a set of one or more 3D objects to be printed in the planned tray and a packing plan indicating an arrangement of the set of 3D objects in the planned tray; and
        generating a new printing plan for the selected planned tray.

2. The system of claim 1, wherein the at least some of the plurality of 3D objects includes a first 3D object, and wherein determining the priority for the at least some of the plurality of 3D objects comprises:
    determining the priority for the first 3D object based, at least in part, on a printing time of the first printer tray using the first 3D printer.

3. The system of claim 2, wherein determining the priority for the first 3D object is further based on a cooling time of the first printer tray.

4. The system of claim 1, wherein the at least some of the plurality of 3D objects includes a first 3D object, and wherein determining the priority for the at least some of the plurality of 3D objects comprises:
    determining the priority for the first 3D object based, at least in part, on whether any post-printing processing is to be performed on the first 3D object.

5. The system of claim 4, wherein determining the priority for the first 3D object is performed based, at least in part, on whether the first 3D object is to be dyed and/or polished after being printed.

6. The system of claim 1, wherein the at least some of the plurality of 3D objects includes a first 3D object, and wherein determining the priority for the at least some of the plurality of 3D objects comprises:
determining the priority for the first 3D object based, at least in part, on a time by which a consumer has indicated that the consumer desires to receive a printed first 3D object.

7. The system of claim 6, wherein determining the priority for the first 3D object is performed further based, at least in part, on a time of day during which the determining is performed.

8. The system of claim 1, wherein accessing the information specifying the plurality of 3D objects to be printed is performed based, at least in part, on information indicating a size of 3D objects that the first 3D printer is adapted to print.

9. The system of claim 1, wherein obtaining the packing plan comprises determining the arrangement of the subset of the 3D objects within the first printer tray.

10. The system of claim 1, wherein obtaining the packing plan comprises receiving the packing plan over a network from a remote computer.

11. The system of claim 1, wherein when the packing plan indicates that there is space for one or more additional 3D objects in the first printer tray, the at least one computer hardware processor is further configured to perform:
assigning to the first printer tray at least one additional object from the plurality of 3D objects; and
obtaining an updated packing plan indicating an arrangement of the subset of the 3D objects and the at least one additional object within the first printer tray.

12. The system of claim 1, wherein the at least one computer hardware processor is further configured to perform:
determining whether the new printing plan is an improvement over the previously-generated printing plan; and
when it is determined that the new printing plan is an improvement over the previously-generated printing plan, replacing the previously-generated printing plan with the new printing plan.

13. The system of claim 12, wherein determining whether the new printing plan is an improvement over the previously-generated printing plan comprises determining whether the new printing plan provides for printing a greater number of 3D objects than the previously-generated printing plan.

14. The system of claim 12, wherein determining whether the new printing plan is an improvement over the previously-generated printing plan comprises determining whether the new printing plan has a greater density of 3D objects than the previously-generated printing plan.

15. The system of claim 12, wherein determining whether the new printing plan is an improvement over the previously-generated printing plan comprises determining whether the revenue and/or profits associated with the new printing plan is greater than the revenue and/or profits associated with the previously-generated printing plan.

16. The system of claim 1, wherein the at least one computer hardware processor is configured to perform:
determining whether to plan a tray for the first 3D printer; and
when it is determined to plan the tray for the first 3D printer, performing the acts of accessing, determining, assigning, and obtaining.

17. The system of claim 1, wherein the at least one 3D printer comprises multiple 3D printers including the first 3D printer, and wherein the at least one computer hardware processor is configured to maintain a queue of trays for each of the multiple 3D printers, including a first queue of trays for the first 3D printer.

18. The system of claim 1, wherein the at least one computer hardware processor is configured further configured to determine whether to proceed with printing, in the first printer tray, the subset of the 3D objects in accordance with the obtained packing plan.

19. The system of claim 18, wherein the at least one computer hardware processor is configured to determine whether to proceed with the printing based on revenue and/or profit associated with printing the subset of the 3D objects.

20. The system of claim 1, wherein the at least one computer hardware processor is further configured to cause the first 3D printer to print the subset of the 3D objects in the first printer tray in accordance with the packing plan.

21. The system of claim 1, wherein the at least one 3D printer comprises a plurality of 3D printers, the plurality of 3D printers including the first 3D printer, and wherein the assigning further comprises:
assigning, based on the determined 3D object priorities, objects in the plurality of 3D objects to a plurality of trays for use with the plurality of 3D printers; and
obtaining a plurality of packing plans indicating, for each one of the plurality of trays, a respective arrangement of objects within the each one tray.

22. The system of claim 21, wherein assigning objects in the plurality of 3D objects to the plurality of trays is performed based, at least in part, on size restrictions associated with the plurality of trays.

23. The system of claim 21, wherein assigning objects in the plurality of 3D objects to the plurality of trays for use with a plurality of 3D printers is performed based, at least in part, on printing and cooling times associated with the plurality of 3D printers.

24. The system of claim 1, wherein the acts of accessing, determining, assigning, and obtaining are performed as part of a real-time service.

25. A method for planning printing of three-dimensional (3D) objects, the method comprising:
using at least one computer hardware processor to perform:
accessing information specifying a plurality of 3D objects to be printed using at least one 3D printer, the at least one 3D printer including a first 3D printer;
determining a priority for each of at least some of the plurality 3D objects to obtain determined 3D object priorities;
assigning, based on the determined 3D object priorities, a subset of the plurality of 3D objects to a first printer tray adapted for use with the first 3D printer;
obtaining a packing plan indicating an arrangement of the subset of the 3D objects within the first printer tray;
identifying a plurality of planned trays associated with the first 3D printer, each of the plurality of planned trays being associated with a respective printing plan;
selecting, from the plurality of planned trays, a planned tray associated with a previously-generated printing plan, the previously-generated printing plan specifying a set of one or more 3D objects to be printed in the planned tray and a packing plan indicating an arrangement of the set of 3D objects in the planned tray; and generating a new printing plan for the selected planned tray.

26. At least one non-transitory computer-readable storage medium storing processor-executable instructions that, when executed by the at least one computer hardware processor, cause the at least one computer hardware processor to perform a method of planning printing of three-dimensional (3D) objects, the method comprising:

accessing information specifying a plurality of 3D objects to be printed using at least one 3D printer, the at least one 3D printer including a first 3D printer;

determining a priority for each of at least some of the plurality 3D objects to obtain determined 3D object priorities;

assigning, based on the determined 3D object priorities, a subset of the plurality of 3D objects to a first printer tray adapted for use with the first 3D printer;

obtaining a packing plan indicating an arrangement of the subset of the 3D objects within the first printer tray;

identifying a plurality of planned trays associated with the first 3D printer, each of the plurality of planned trays being associated with a respective printing plan;

selecting, from the plurality of planned trays, a planned tray associated with a previously-generated printing plan, the previously-generated printing plan specifying a set of one or more 3D objects to be printed in the planned tray and a packing plan indicating an arrangement of the set of 3D objects in the planned tray; and generating a new printing plan for the selected planned tray.

\* \* \* \* \*